(12) United States Patent
Hamdan et al.

(10) Patent No.: US 12,061,073 B2
(45) Date of Patent: Aug. 13, 2024

(54) WARHEAD AND METHOD OF PRODUCING SAME

(71) Applicant: BAE SYSTEMS BOFORS AB, Karlskoga (SE)

(72) Inventors: Hamzah Hamdan, Karlskoga (SE); Christer Thuman, Karlskoga (SE); Björn Johansson, Karlskoga (SE)

(73) Assignee: BAE SYSTEMS BOFORS A B, Karlskoga (SE)

( * ) Notice: Subject to any disclaimer, the term of this patent is extended or adjusted under 35 U.S.C. 154(b) by 366 days.

(21) Appl. No.: 17/436,635

(22) PCT Filed: Mar. 9, 2020

(86) PCT No.: PCT/SE2020/050257
§ 371 (c)(1),
(2) Date: Sep. 6, 2021

(87) PCT Pub. No.: WO2020/190193
PCT Pub. Date: Sep. 24, 2020

(65) Prior Publication Data
US 2022/0155045 A1 May 19, 2022

(30) Foreign Application Priority Data
Mar. 19, 2019 (SE) .................... 1900054-6

(51) Int. Cl.
*F42B 1/032* (2006.01)
*B33Y 10/00* (2015.01)
(Continued)

(52) U.S. Cl.
CPC ............. *F42B 1/032* (2013.01); *B33Y 10/00* (2014.12); *B33Y 80/00* (2014.12); *F42B 1/028* (2013.01); *F42B 1/036* (2013.01)

(58) Field of Classification Search
CPC ........... F42B 1/032; F42B 1/036; F42B 1/028
See application file for complete search history.

(56) References Cited

U.S. PATENT DOCUMENTS 3,218,975 A * 11/1965 Massey .................. F42B 1/028
102/476
3,224,368 A * 12/1965 House .................... F42B 1/032
102/306
(Continued)

FOREIGN PATENT DOCUMENTS

CN 105014072 B 6/2017
FR 2681677 A1 3/1993

OTHER PUBLICATIONS

International Search Report (May 8, 2020) for corresponding International App. PCT/SE2020/050257.

*Primary Examiner* — Derrick R Morgan
(74) *Attorney, Agent, or Firm* — WRB-IP PLLC

(57) ABSTRACT

A method for producing a warhead with directed blasting action involves the step of making an outer casing and arranging therein a charge with a cavity situated at the front end of the charge. An insert whose shape corresponds to the shape of the cavity is arranged on the surface of the charge. The method furthermore involves the step of depositing a material on the insert in an additive manufacturing process. A warhead manufactured according to the method includes an outer casing, a charge with a cavity situated at the front end of the charge, and an insert. A material is deposited on the insert.

11 Claims, 7 Drawing Sheets

(51) Int. Cl.
  *B33Y 80/00* (2015.01)
  *F42B 1/028* (2006.01)
  *F42B 1/036* (2006.01)

(56) References Cited

U.S. PATENT DOCUMENTS

| | | | | |
|---|---|---|---|---|
| 3,255,659 A * | 6/1966 | Venghiattis | ............. | F42B 1/036 102/306 |
| 4,080,898 A * | 3/1978 | Gieske | .................... | F42B 1/028 102/306 |
| 4,702,171 A * | 10/1987 | Tal | .......................... | F42B 1/032 102/307 |
| 4,766,813 A * | 8/1988 | Winter | .................... | F42B 1/032 102/307 |
| 5,237,929 A * | 8/1993 | Ekholm | .................... | F42B 1/02 102/306 |
| 5,365,852 A * | 11/1994 | Bender | .................... | F42B 1/028 102/501 |
| 6,152,040 A | 11/2000 | Riley et al. | | |
| 7,278,354 B1 | 10/2007 | Langan et al. | | |
| 8,813,651 B1 * | 8/2014 | Hooke | .................... | F42B 1/036 86/1.1 |
| 10,921,089 B1 * | 2/2021 | Vabnick | ................ | F41B 9/0046 |
| 2004/0200377 A1 * | 10/2004 | Collins | .................... | F42B 1/028 102/476 |
| 2005/0011395 A1 * | 1/2005 | Langan | .................... | F42B 1/032 102/476 |
| 2005/0115448 A1 * | 6/2005 | Pratt | ....................... | F42B 1/032 102/476 |
| 2006/0180045 A1 * | 8/2006 | Ronn | ........................ | F42B 1/02 102/492 |
| 2007/0214991 A1 * | 9/2007 | Ronn | ....................... | F42B 1/028 102/306 |
| 2010/0139515 A1 * | 6/2010 | King | ....................... | F42B 1/024 86/20.1 |
| 2010/0319562 A1 * | 12/2010 | Yang | ....................... | F42B 1/028 102/309 |
| 2011/0219978 A1 * | 9/2011 | Glenn | .................... | F42B 1/028 102/307 |
| 2013/0104765 A1 * | 5/2013 | Stecher | .................... | F42B 1/032 102/476 |
| 2014/0291022 A1 | 10/2014 | Yang et al. | | |
| 2014/0310940 A1 * | 10/2014 | Grattan | .................... | F42B 1/036 427/407.1 |
| 2019/0310056 A1 * | 10/2019 | Loehken | ................ | F42B 1/028 |
| 2023/0131652 A1 * | 4/2023 | Loehken | ................ | F42B 1/036 102/307 |

* cited by examiner

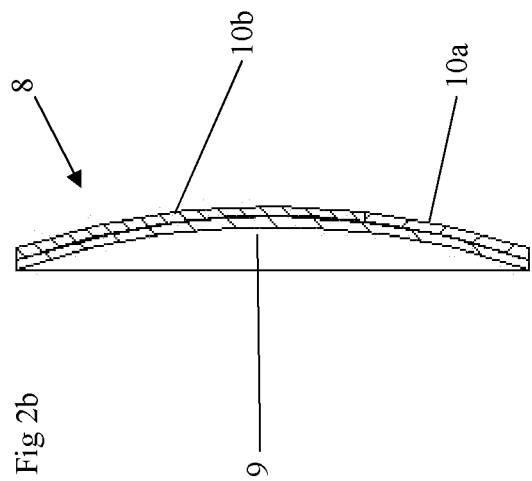
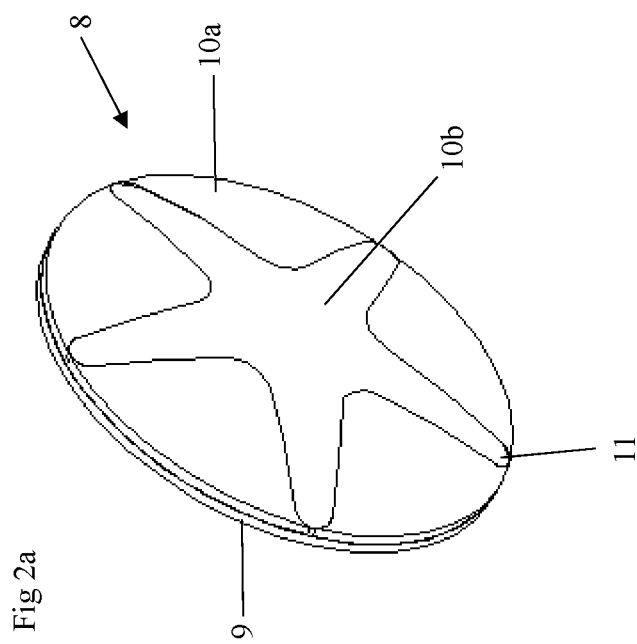

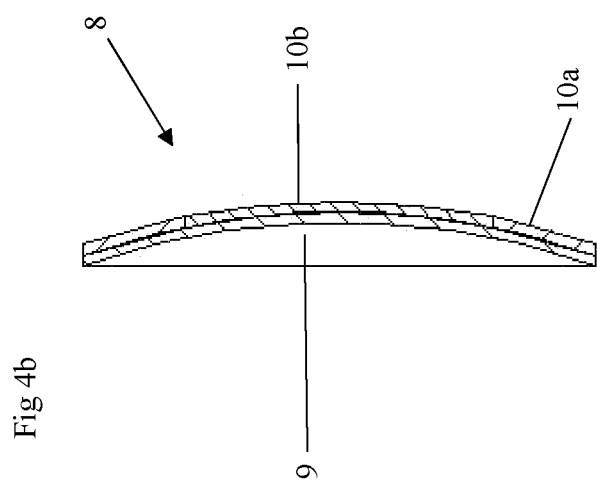
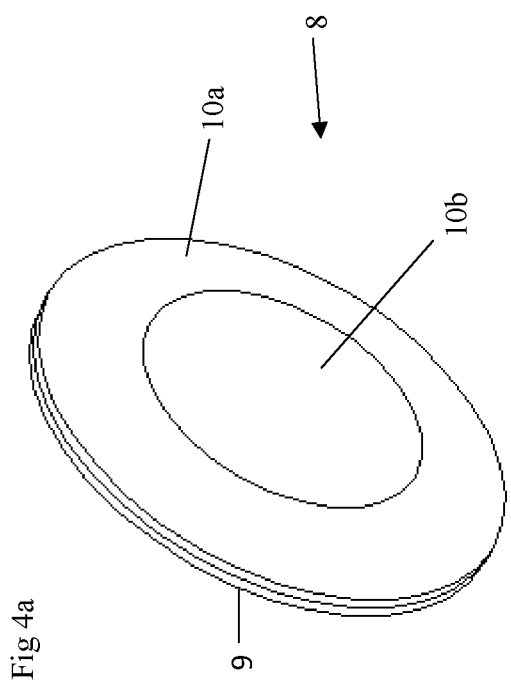

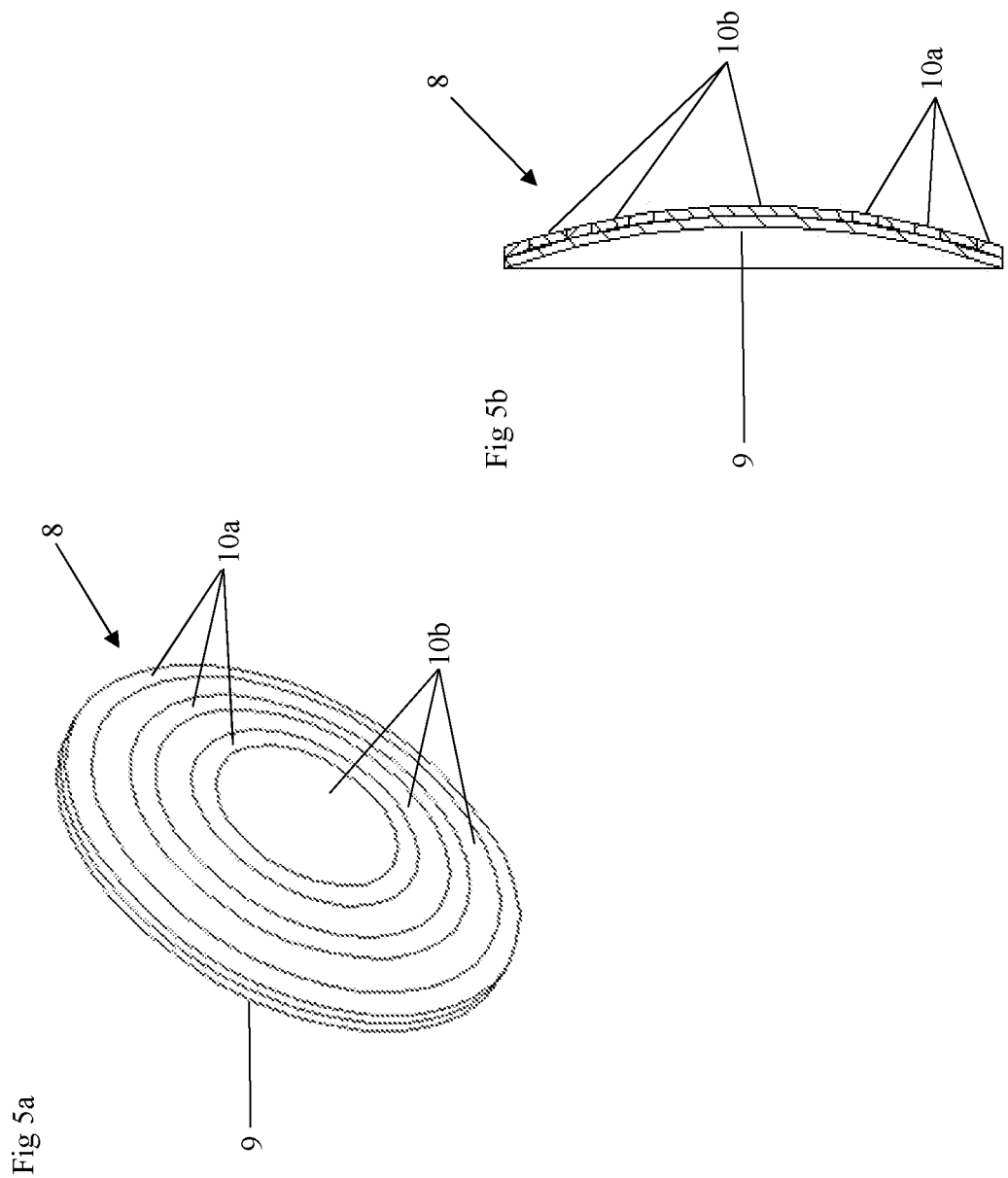

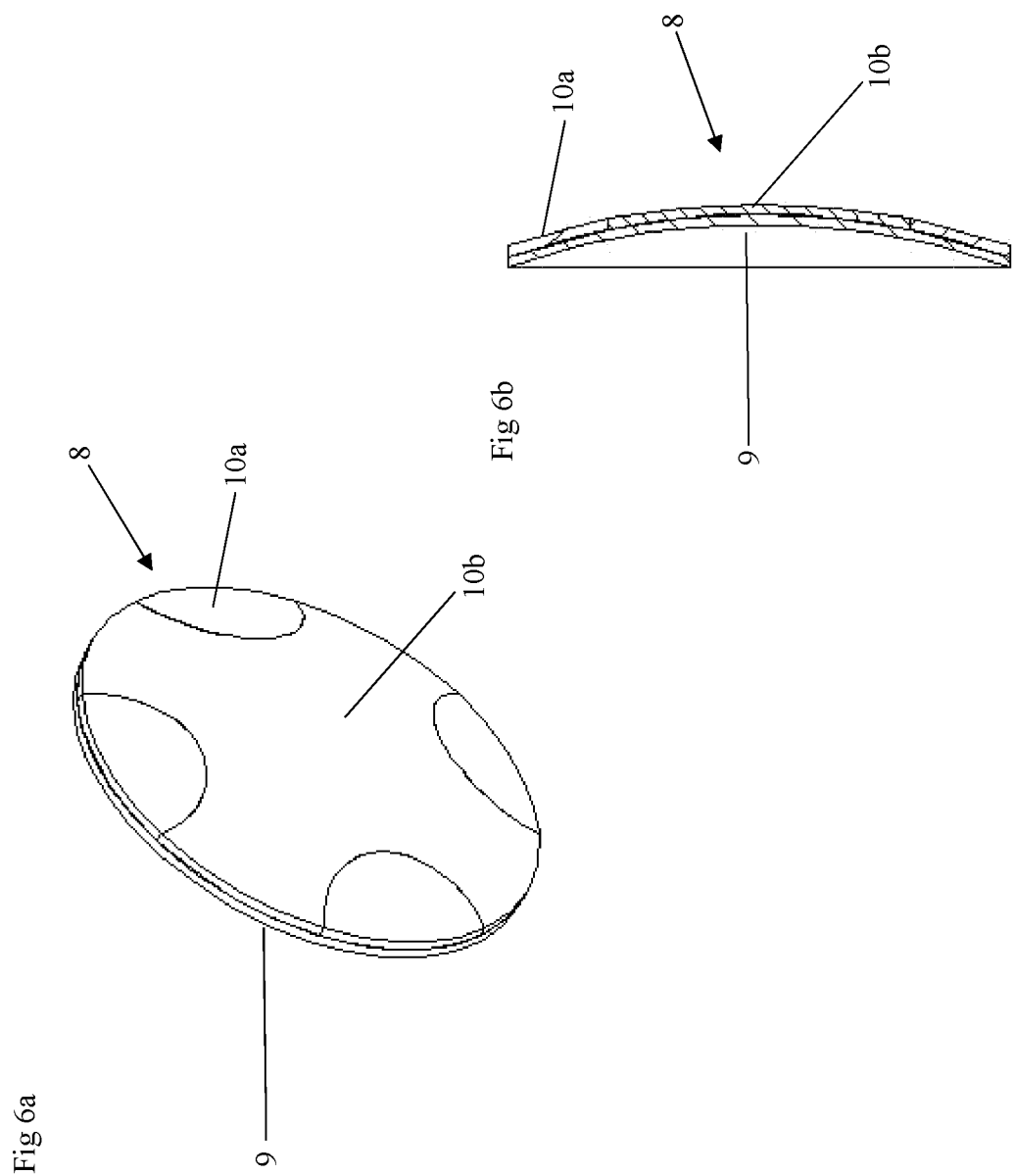

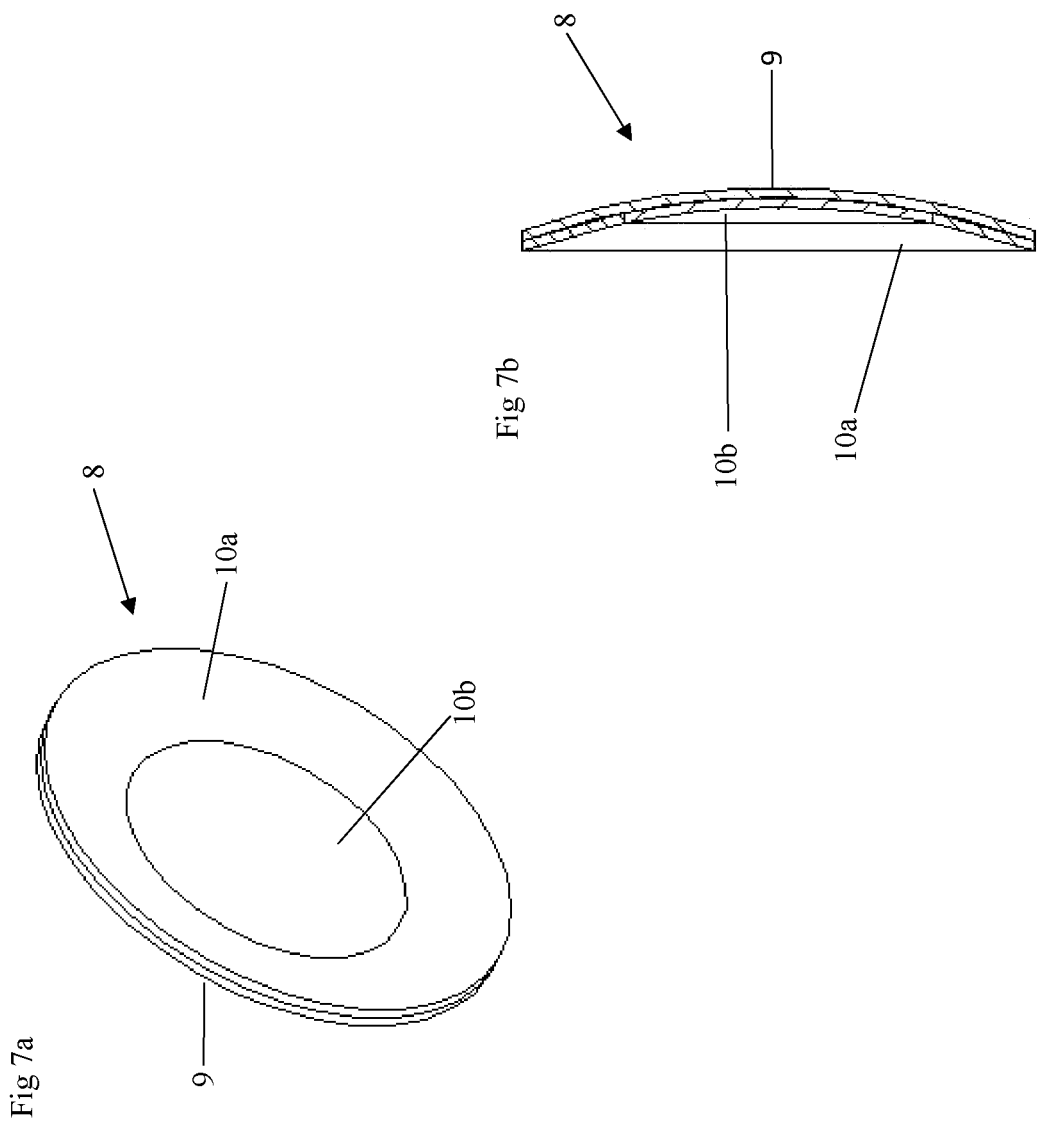

WARHEAD AND METHOD OF PRODUCING SAME

BACKGROUND AND SUMMARY

The present invention relates to a method for producing a warhead with directed blasting action, wherein the method involves the step of making an outer casing, arranging therein a charge with a cavity situated at the front end of the charge, and arranging an insert whose shape corresponds to the shape of the cavity on the surface of the charge.

The invention also relates to a warhead manufactured according to the method, and comprising an outer casing, a charge with a cavity situated at the front end of the charge, and an insert.

Warheads with directed blasting action (RSV) have long been used, primarily to create a piercing of armor. An RSV-warhead generally comprises a charge having a cavity at its front end, i.e., the end directed toward the target. The blasting action is directed and concentrated on a limited zone of the target, and a deeper and narrower hole in the target is achieved. The cavity is often conical in shape, yet other forms are conceivable.

Furthermore, if the cavity is lined with a metal insert whose shape agrees with the shape of the cavity, e.g., conical, the insert can function to further enhance the effect of the directed blasting action. The energy from the detonated charge transforms the insert either into a jet of metal or a cohesive projectile. Critical factors for the process are the mutual relation between the quantity of metal and the quantity of explosive, and the properties of the metal and the explosive. The precise geometry of the cavity and the insert also has a major effect on the effect of the warhead.

Over time, there has been a development of armor and corresponding protective arrangements to bring about an improved protection against warheads both with and without directed blasting action. The piercing force of the warheads having a directed blasting action has also increased as part of this development, and there is a general effort to further improve their effect and their precision in order to minimize the damage to the surroundings.

Thus, it is desirable to create a more effective warhead which can be manufactured in the most cost-effective way possible.

According to an aspect of the invention, a method includes the step of depositing a material on the insert in an additive manufacturing process.

According to another aspect of the invention, a warhead includes a material deposited on the insert.

Further benefits are obtained if the invention is furthermore given one or more of the characteristics according to one or more of the dependent patent claims.

BRIEF DESCRIPTION OF THE DRAWINGS

The invention shall now be described with reference to enclosed drawings. These show:

FIG. 2a-b a piercing body contained in a warhead according to a second embodiment of the invention;

FIG. 4a-b a piercing body contained in a warhead according to a fourth embodiment of the invention;

FIG. 5a-b a piercing body contained in a warhead according to a fifth embodiment of the invention;

FIG. 6a-b a piercing body contained in a warhead according to a sixth embodiment of the invention; and FIG. 7a-b a piercing body contained in a warhead according to a seventh embodiment of the invention.

DETAILED DESCRIPTION

Figure 1:
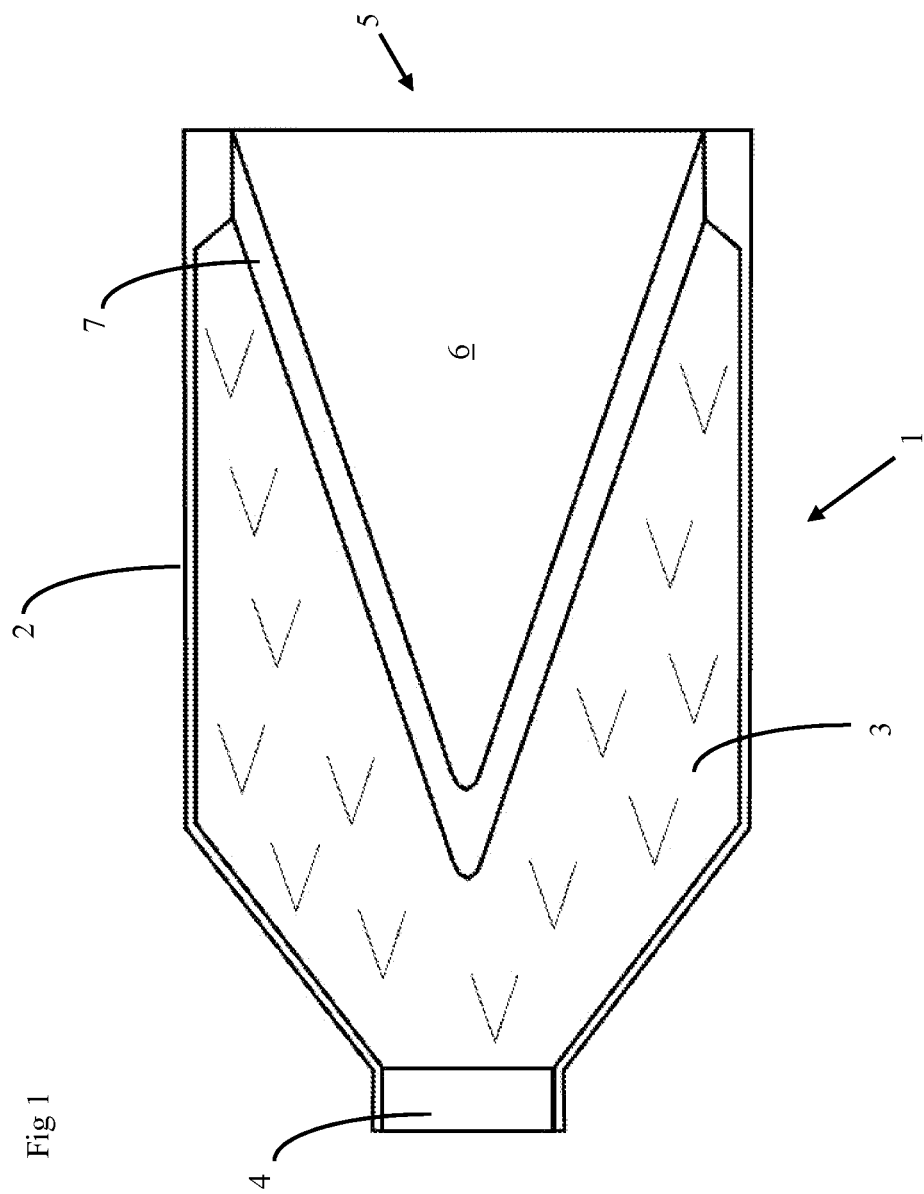
FIG. 1 a warhead in which the invention can be employed in a first embodiment.
Figure 3A:
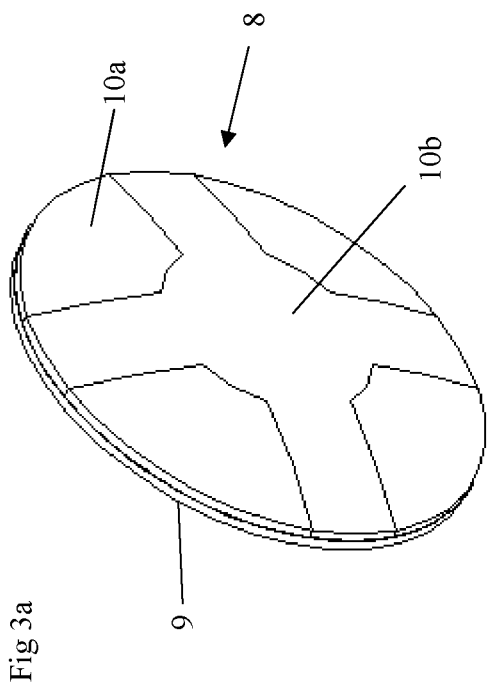
FIG. 3a-b a piercing body contained in a warhead according to a third embodiment of the invention.
Figure 3B:
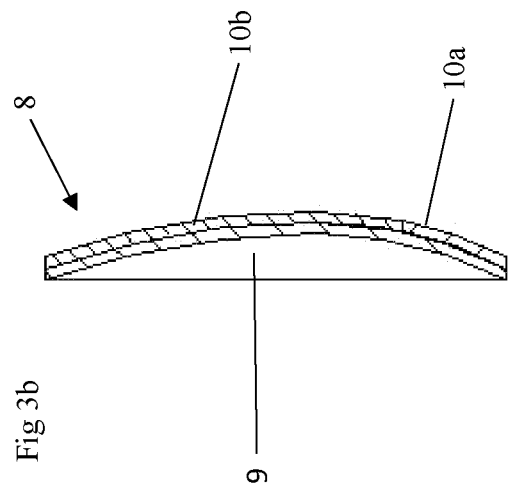

FIG. 1 shows an RSV-warhead 1, whose main features concur with the prior art. The warhead 1 has an outer casing 2, which encloses an explosive charge 3. An initiating element 4 is arranged to make the charge 3 detonate at a given time.

The charge 3 has at its front end 5, directed toward the target, a cavity 6, which in FIG. 1 has a largely conical shape. The inner surface of the cavity 6 is provided with an insert 7. In this regard, the warhead 1 is configured in accordance with the prior art, and a detonation of the warhead 1 per FIG. 1 will result in the insert 7 forming a jet, or a projectile, having a large penetrating ability against armor, etc.

In one preferred embodiment, the insert 7 is at least partly made of a metal. According to the preferred embodiment of the invention, the insert 7 has a construction wherein a material is deposited on a base structure, which in certain variants is a metal, but according to other variants of the invention it consists of or comprises a different material, such as a polymer, a ceramic material, a glasslike amorphous material, etc.

The deposited material is arranged on the base structure by some type of additive manufacturing process. The material may be applied in powder form or in wire form, and it is melted in connection with the deposition, so that it is immediately fixed in the desired place on the base structure of the warhead 1. The deposited material may be a metal, but it may also be a different material, such as a polymer, a ceramic material, a glasslike amorphous material, etc. By depositing, it is meant that material is applied preferably with an additive manufacturing method.

The choice between the alternatives of powder and wire during the additive manufacturing is based, among other things, on the geometrical dimensions of the product and the required strength of the finished product. The choice may also depend on the forms in which the desired material is available. Powder is often preferred for narrow manufacturing conditions, i.e., when the material supplied is supposed to reach into spaces with small dimensions. Yet material in wire form is generally more cost-effective, and is often regarded as being adequate for the current dimensions and strength requirements. Material in wire form also has the manufacturing benefit that the quantity of material unintentionally given off to the surroundings is minimal, i.e., the manufacturing basically produces no dust at all.

The high temperatures used for the melting of the applied material may mean that the material in the underlying basic structure is somehow affected. If such an influencing is unwanted, the material in the basic structure is chosen so that it is not affected by the actual temperature. If an influencing is desired in order to achieve certain effects in the finished product, the choice of material in the basic structure and in the applied material is coordinated to obtain the desired effect.

With an appropriate choice of the material in the basic structure and in the applied material, the material in the basic structure will melt, become brittle, or form an alloy with the applied material. An alternative is that the basic structure and the applied material do not influence each other's physical properties. The layer of the applied material in certain embodiments is made thinner or thicker in certain zones of the material making up the basic structure. This may be accomplished in various ways. Some alternatives are to vary the temperature and/or the rate of the depositing of material. The same material may also be laid down in multiple layers, together forming a thicker stratum.

It is also conceivable to lay down several different materials with different properties in different zones of the basis structure. The zones with different material are in certain cases well bounded off from each other and may be situated at sizeable distance from each other. In other cases, they lie against each other, and may even overlap each other.

Depending on the properties of the applied materials, they may form alloys with each other or react in a predetermined sequence upon detonation. They may also affect how the insert 7 forms a jet upon detonation. In all these instances, the material ingredients, their placement, and the temperature of the material deposition will be chosen such that the result is that the applied material and the basic structure together create an insert 7 providing a desired effect for the warhead.

Any deliberate attenuations in the insert formed by the applied material and the basic structure will produce a controlled fragmentation upon detonation of the warhead 1, in addition to affecting the formation of a jet.

Some examples of material which can be chosen for the applied material are aluminum, zirconium, titanium, steel of different grades, including stainless steel, copper, iron, tantalum, etc. Some of the materials have distinct properties which are sought after in certain applications, such as reactive material like zirconium, aluminum and titanium, moldable material like tantalum, and material with high density, such as copper, iron and tantalum. The different properties are utilized to produce desired effects in the jet formed, including its speed and penetrating ability.

FIG. 2*a* shows a piercing body 8 according to another embodiment of the invention. Such a piercing body 8, similar to the insert 7 in the preceding embodiment, is arranged at the front end 5 of the warhead 1, but its extension in the lengthwise direction is less, so that its shape becomes more like that of a bowl or plate.

The piercing body 8 comprises a bowl-shaped basic structure 9, which similar to the construction in FIG. 1 can be made of metal, but also of a number of other materials, as described above. On one side of the basic structure 9 there are arranged two different applied materials 10*a*, 10*b*. In the exemplary embodiment shown, the material 10*a*, 10*b* is arranged on the convex side of the basic structure 9.

The one material 10*b* is arranged in a starlike formation, with arms 11 reaching out toward the edge of the piercing body 8. The other material is arranged in zones extending between the arms 11. The different properties of the different materials 10*a*, 10*b* in regard to reactivity, together with the shape of the piercing body 8, will affect the shape, direction, speed and piercing ability of the jet or projectile formed. The arrangement of the materials 10*a*, 10*b* in the different zones also produces effects upon detonation such as affecting the shape, direction, speed and piercing ability of the jet or projectile formed. Any attenuations produced in the applied material, or in the basic structure, can be used to produce a controlled fragmentation of the piercing body 8 upon detonation. Thus, it is possible to affect to a very high degree the properties and performance of the jet or projectile formed through the geometrical arrangement of the applied materials 10*a*, 10*b*. The geometrical arrangement means that two materials are laid down in the same layer and cover different surfaces in the same layer.

FIG. 2*b* shows a cross section of the piercing body 8. In the embodiment shown, the thickness of the applied material 10*a*, 10*b* is approximately on the same order of magnitude as the thickness of the basic structure 9. The thickness of applied material 10*a*, 10*b* can be mutually adapted for different properties and results in different embodiments of the invention.

FIGS. 3*a-b*, 4*a-b*, 5*a-b* and 6*a-b* show embodiments corresponding to those shown in FIG. 2*a-b*. The arrangement of the materials 10*a*, 10*b* varies with different geometrical forms in the respective embodiment. The arrangement may, as shown, comprise cross shapes, circles, rings, semicircles, etc. The configurations should be viewed merely as examples of how the geometrical shapes can be varied, and a person skilled in the art may see further possibilities of varying them to achieve desired effects.

FIG. 7*a-b* shows a further embodiment of a piercing body 8. In this embodiment, the applied material 10*a*, 10*b* is arranged on the concave side of the basic structure 9. The person skilled in the art may vary the geometrical arrangement in appropriate ways, as in the aforementioned exemplary embodiments.

Further embodiments not distinctly indicated in the figures, but which should be noted, are the embodiments in which the piercing body 8 comprises several different layers of applied material 10*a*, 10*b* one on top of another. An area with multiple layers of different material 10*a*, 10*b* may extend over the entire piercing body 8, possibly on both sides of the basic structure 9. In other embodiments, the areas with multiple layers of different material 10*a*, 10*b* one on top of another are confined to one or more zones not comprising the entire piercing body 8. If there are multiple different zones with multiple layers of different material 10*a*, 10*b*, it is possible that the material combination will be the same in all the zones, but variants with different material combinations in different zones are also conceivable.

The exemplary embodiments illustrated and discussed above may be further varied within the scope of the enclosed patent claims. The person skilled in the art may experiment with the choice of material for both the basic structure and the applied material, material combinations, geometrical arrangement of applied material, the geometry of the basic structure, material thicknesses and attenuations, etc. Special features and properties in the aforementioned examples may be combined with each other in various ways in order to create further embodiments of the invention.

The invention claimed is:

1. A method for producing a warhead with directed blasting action, comprising
    making an outer casing,
    arranging a charge in the outer casing with a cavity situated at a front end of the charge,
    arranging an insert whose shape corresponds to the shape of the cavity on a surface of the charge,
        depositing a material on an outer surface of the insert in an additive manufacturing process,
    laying down the deposited material so that a thickness of the deposited material on the insert at a given cross-section of the insert perpendicular to a longitudinal axis of the insert is zero in at least one zone and non-zero in at least one other zone.

2. The method according to claim 1, wherein the material is deposited in zones on the insert.

3. The method according to claim 1,
    wherein several different materials are deposited on the insert.

4. The method according to claim 3, wherein the material which is deposited is laid down in two or more overlapping layers.

5. A warhead manufactured according to a method, the method comprising making an outer casing, arranging a charge in the outer casing with a cavity situated at a front end of the charge, arranging an insert whose shape corresponds to the shape of the cavity on a surface of the charge, depositing a material on an outer surface of the insert in an additive manufacturing process, and laying down the deposited material so that a thickness of the deposited material on the insert at a given cross-section of the insert perpendicular to a longitudinal axis of the insert is zero in at least one zone and non-zero in at least one other zone, the warhead comprising the outer casing, the charge, and the insert with the deposited material.

6. The warhead according to claim 5, wherein the deposited material is arranged in zones on the insert.

7. The warhead according to claim 5, wherein a plurality of different materials are deposited on the insert.

8. The warhead according to claim 5, wherein the deposited material is reactive.

9. The warhead according to claim 5, wherein the deposited material has an amorphous structure.

10. The warhead according to claim 5, wherein the insert has a lesser extension in a direction of a longitudinal axis of the warhead than in a direction transverse to the longitudinal axis.

11. The warhead according to claim 7, wherein two or more materials are arranged in overlapping layers.

\* \* \* \* \*